Patented Aug. 18, 1953

2,649,459

UNITED STATES PATENT OFFICE 2,649,459

2-THIOHYDANTOINS CONTAINING A CARBOXYARYL GROUP AND METHOD OF PREPARATION

Leslie G. S. Brooker and Frank L. White, Rochester, N. Y., assignors to Eastman Kodak Company, Rochester, N. Y., a corporation of New Jersey No Drawing. Application September 8, 1950, Serial No. 183,906

6 Claims. (Cl. 260—309.5)

This invention relates to 2-thiohydantoins containing a carboxyaryl group and a method for preparing them. More particularly, this invention relates to 2-thiohydantoins containing a carboxyaryl group, which are useful in the preparation of polymethine, photographic sensitizing dyes.

2-thiohydantoins containing an aryl group have long been known. 2-thiohydantoins containing phenyl groups attached to both of the nitrogen atoms have also been previously described (see Beilstein's "Hand. der Organ. Chem.," vol. 24 (4th ed.), pg. 260). These 2-thiohydantoins have been used as intermediates in the preparation of polymethine, photographic sensitizing dyes of the merocyanine, oxonol, and hemioxonol types, however, certain of these dyes do not have sufficient sensitizing power to be of much utility and some do not adhere to the silver halide grains, where sensitization occurs. These and other difficulties are, in general, met by the new 2-thiohydantoins of our invention as shown in our copending application Serial No. 48,316, filed September 8, 1948 (now U. S. Patent 2,526,632, issued October 24, 1951), which is a continuation-in-part of application Serial No. 605,472, filed July 16, 1945, now U. S. Patent 2,493,747, dated January 10, 1950.

This application is a continuation in part of our copending application Serial No. 48,316.

Accordingly, an object of our invention is to provide 2-thiohydantoins containing a carboxyaryl group and a method for preparing them. Another object is to provide 2-thiohydantoins containing a carboxyaryl group which are useful in the preparation of polymethine, photographic sensitizing dyes. Another object is to provide new 2-thiohydantoins containing a carbalkoxyaryl group. Other objects will become apparent from a consideration of the following description and examples.

The new 2-thiohydantoins of our invention can be represented by the following general formula:

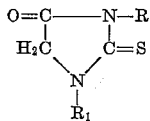

wherein R represents an alkyl group, such as methyl, ethyl n-propyl, n-butyl, isobutyl, etc. groups (e. g. an alkyl group of the formula $C_nH_{2n+1}$ wherein $n$ represents a positive integer of from 1 to 4), or an aryl group, such as phenyl, o-, m-, or p-chlorophenyl, o-, m-, or p-tolyl, etc. (e. g. a mononuclear aryl group of the benzene series, i. e. a monocyclic aryl radical), or a naphthyl group, etc., and $R_1$ represents a carboxyaryl group, such as o-, m-, or p-carboxyphenyl 5-carboxy-2-ethoxyphenyl, 2-carboxy-5-chlorophenyl, 5-carboxy-2,4-dimethoxyphenyl, 2-carboxy-m-tolyl, 3-carboxy-p-tolyl, etc.

According to our invention, we prepare our new 2-thiohydantoins containing a carboxyaryl group by condensing a glycine ester selected from those represented by the following general formula:

I  $\quad R_4\text{---}NH\text{---}CH_2\text{---}COOR_3$ wherein $R_3$ represents an alkyl group, such as methyl, ethyl, n-propyl, n-butyl, isobutyl, etc. groups (e. g. an alkyl group of the formula $C_nH_{2n+1}$ wherein $n$ represents a positive integer of from 1 to 4), and $R_4$ represents a carbalkoxyaryl group, such as carbalkoxyphenol or carbalkoxynaphthyl groups, etc., with an alkyl- or arylisothiocyanate, followed by hydrolysis of the resulting 1-carbalkoxyaryl-2-thiohydantoin to the desired 1-carboxyaryl-2-thiohydantoin.

Glycine esters coming within the scope of those represented by Formula I above which have been found to be especially useful comprise those represented by the following general formula:

II 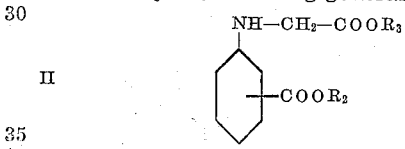

wherein $R_3$ has the meaning set forth above and $R_2$ has the values assigned to $R_3$. Also included are simple, nuclear-substituted derivatives of such glycine esters, such as chlorine, bromine, methoxyl, ethoxyl, methyl, ethyl, etc. substituted derivatives.

The alkyl- or arylisothiocyanates useful in practicing the process of our invention can advantageously be represented by the following general formula:

III  $\quad R\text{---}CNS$ wherein R represents an alkyl group, such as methyl, ethyl, n-propyl, isopropyl, n-butyl, isobutyl, etc. groups (e. g. an alkyl group of the formula $C_nH_{2n+1}$ wherein $n$ represents a positive integer of from 1 to 4) or an aryl group, such as phenyl, o-, m-, or p-chlorophenyl, o-, m-, or p-tolyl, etc. (e. g. a mononuclear aryl group of the benzene series). Typical isothiocyanates include, for example, methyl, ethyl, n-propyl, isopropyl, n-butyl, isobutyl, phenyl, o-, m-, or p-chlorophenyl, o-, m-, or p-tolyl, etc. isothiocyanates.

The glycine esters represented by Formulas I and II above can advantageously be prepared by condensing an alkyl aminoarylcarboxylate with an alkyl halogenoacetate. The condensations are advantageously carried out in an inert diluent, such as aliphatic alcohols, e. g. ethyl, n-propyl, isopropyl, etc. alcohols and at the reflux temperature of the reaction mixture. Typical alkyl aminoarylcarboxylates include, for example, methyl, ethyl, n-propyl, isopropyl, n-butyl, etc. p-aminobenzoates, methyl anthranilate, ethyl m-aminobenzoate, n-butyl m-aminobenzoate, methyl 2-amino-m-toluate, methyl 4-amino-m-toluate, ethyl 4-amino-m-toluate, ethyl 3-amino-4-ethoxybenzoate, methyl 5-amino-2,4-dimethoxybenzoate, methyl 2-amino-4-chlorobenzoate, ethyl 5-amino-1-naphthoate, methyl 3-amino-2-naphthoate, ethyl 3-amino-2-naphthoate, isobutyl 3-amino-2-naphthoate, etc. Typical alkyl halogenoacetates include, for example, methyl, ethyl, isopropyl, n-butyl, etc. chloroacetates, methyl, ethyl, n-propyl, etc. bromoacetates, methyl iodoacetate, ethyl iodoacetate, etc.

The following equations illustrate schematically the method of practicing our invention in the prepartion of 1-carboxyphenyl 2-thiohydantoins:

Equation A:

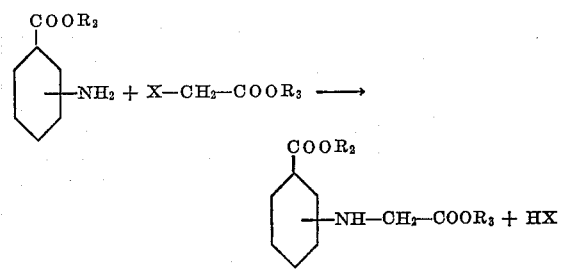

Equation B:

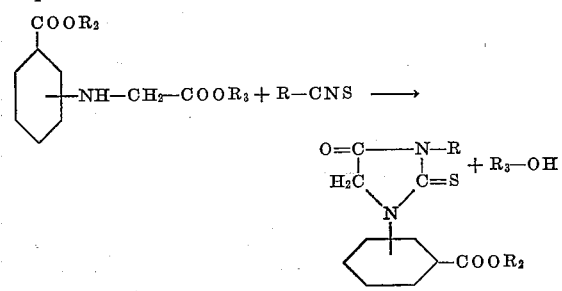

Equation C:

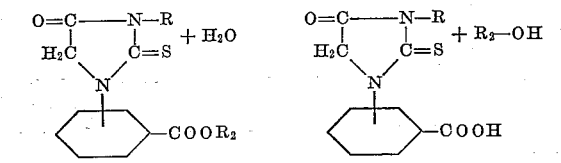

wherein R, R₂, and R₃ have the meanings set forth above, and X represents a halogen atom, e. g. chlorine, bromine, iodine, etc. The hydrolysis of Equation C is advantageously effected in aqueous alkaline solution and with heating, e. g. at the reflux temperature of the reaction mixture. Alkaline agents catalyzing the hydrolysis comprise the alkali metal hydroxides, e. g. sodium hydroxide, potassium hydroxide, etc., alkali metal carbonates, e. g. sodium carbonate, potassium carbonate, etc. The reaction medium is then acidified and the product separated by filtration.

The following examples illustrate the manner whereby we practice our invention.

*Example 1.—N - (p - carbethoxyphenyl) glycine ethyl ester*

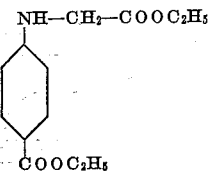

33 g. of ethyl p-aminobenzoate, 16.7 g. of ethyl bromoacetate and 100 cc. of ethyl alcohol were refluxed together for 48 hours. The resulting solution was dissolved in water, and then made alkaline with sodium carbonate. The product was extracted with diethyl ether, and after drying the ether solution over magnesium sulfate, it was distilled. 11.8 of N-(p-carbethoxyphenyl) glycine ethyl ester boiling at 240°-250° C./20 mm. were obtained.

In like manner by replacing the ethyl p-aminobenzoate in the above example with an equimolar amount of methyl 3 - amino-2-naphthoate, N-(3-carbomethoxy-2-naphthyl) glycine ethyl ester represented by the following formula:

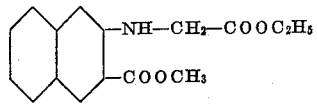

can be obtained.

*Example 2.—1 - p-carbethoxyphenyl-3-phenyl-2-thiohydantoin*

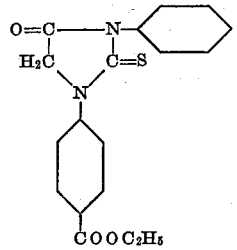

11.8 g. of N-(p-carbethoxyphenyl) gylcine ethyl ester were heated together with 6.7 g. of phenyl isothiocyanate on a steam bath for 36 hours. A small quantity of ethyl alcohol was added to the reaction mixture, which was then chilled. The solid which separated was filtered off, washed with a small amount of ethyl alcohol, and dried. A yield of 1-p-carbethoxyphenyl-3-phenyl-2-thiohydantoin, which amounted to 1.9 g., was obtained in the form of a solid melting at 188°-190° C.

In like manner by replacing the phenylisothiocyanate in the above example by an equimolar amount of ethyl isothiocyanate, 1-p-carbethoxyphenyl-3-ethyl-2-thiohydantoin represented by the following formula:

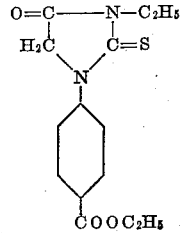

can be obtained.

*Example 3.—1 - p - carboxyphenyl-3-phenyl-2-thiohydantoin*

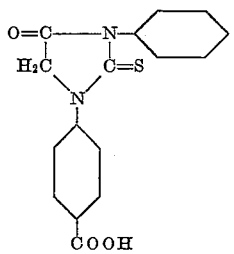

1.9 g. of 1-p-carbethoxyphenyl-3-phenyl-2-thiohydantoin were dissolved in 12 cc. of a 7.5 per cent aqueous solution of sodium hydroxide by refluxing the mixture for 30 seconds. The reaction mixture was then chilled in an ice-water bath, and was made acid by the addition of concentrated hydrochloric acid. It was again chilled to 0° C., and the precipitate which separated was filtered off, washed free of acid with water, and dried. A yield of 1.5 g. of 1-p-carboxyphenyl-3-phenyl-2-thiohydantoin melting at 278°–280° C. was obtained.

In like manner the 1-p-carbethoxyphenyl-3-ethyl-2-thiohydantoin obtainable as described in Example 2 above can be hydrolyzed to give the corresponding 1 - p-carboxyphenyl-3-ethyl-2-thiohydantoin. The concentration of the alkali can be varied, although we have found that from 2 to 30% by weight solutions have been found to be the most useful.

Similarly, N-(3-carbomethoxy - 2 - naphthyl) glycine ethyl ester obtainable as described in Example 1 above can be condensed with p-tolyl isothiocyanate to give the product:

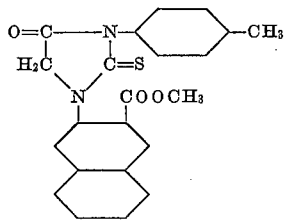

which can be hydrolyzed as described in Example 3 above to give the product:

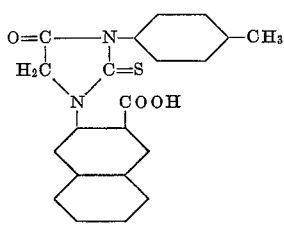

The 2-thiohydantoin compounds obtainable according to our invention are useful in the preparation of oxonol, hemioxonol, and merocyanine dyes. The preparation of certain of the more useful merocyanine dyes containing a 1-carboxyaryl-2-thiohydantoin nucleus has been described in our copending application Serial No. 48,316. The new 2-thiohydantoin compounds of our invention are also useful in the preparation of useful soporific and analgesic substances.

What we claim as our invention and desire secured by Letters Patent of the United States is:

1. A compound selected from those represented by the following general formula:

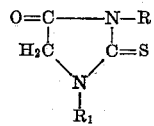

wherein R represents a member selected from the group consisting of an alkyl group of the formula $C_nH_{2n+1}$ wherein $n$ represents a positive integer of from 1 to 4, a monocyclic aryl radical and a naphthyl group and $R_1$ represents a carboxy-aryl group containing from 7 to 11 carbon atoms.

2. A compound selected from those represented by the following general formula:

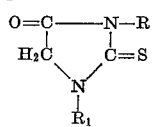

wherein R represents a monocyclic aryl group and $R_1$ represents a carboxyphenyl group.

3. The compound represented by the following formula:

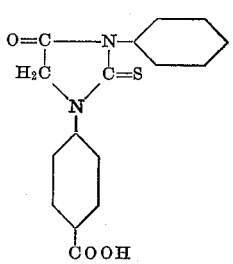

4. A process for preparing a 1-carboxyaryl-2-thiohydantoin comprising heating under reflux a N-(carbalkoxyaryl)glycine alkyl ester with an isothiocyanate selected from those represented by the following general formula:

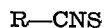

R—CNS wherein R represents a member selected from the group consisting of an alkyl group of the formula $C_nH_{2n+1}$ wherein $n$ represents a positive integer of from 1 to 4, a monocyclic aryl radical and a naphthyl group, and hydrolyzing the 1-carbalkoxyaryl-2-thiohydantoin thus formed by heating an aqueous solution of the said 1-carbalkoxyaryl-2-thiohydantoin.

5. A process for preparing a 1-carboxyaryl-2-thiohydantoin comprising heating under reflux a N-(carbalkoxyaryl)glycine alkyl ester selected from those represented by the following general formula:

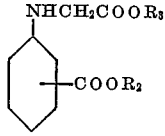

wherein $R_2$ and $R_3$ each represent an alkyl group of from 1 to 4 carbon atoms, with an isothiocyanate selected from those represented by the following general formula:

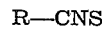

R—CNS wherein R represents a monocyclic aryl group hydrolyzing the 1-carbalkoxyaryl-2-thiohydantoin thus formed by heating an aqueous alkaline solution of the said 1-carbalkoxyaryl-2-thiohydantoin, and acidifying the reaction mixture.

6. A process for preparing 1-p-carboxyphenyl- 3-phenyl-2-thiohydantoin comprising heating under reflux N-(p-carbethoxyphenyl) glycine ethyl ester with phenyl isothiocyanate, hydrolyzing the 1-p-carbethoxyphenyl-3-phenyl-2-thiohydantoin thus formed by heating an aqueous alkaline solution of the said 1-p-carbethoxyphenyl-3-phenyl-2-thiohydantoin, and acidifying the reaction mixture.

LESLIE G. S. BROOKER.
FRANK L. WHITE.

References Cited in the file of this patent

UNITED STATES PATENTS

| Number | Name | Date |
| --- | --- | --- |
| 2,551,134 | Jennings | May 1, 1951 |